United States Patent

Kuroda et al.

[11] Patent Number: 5,944,544
[45] Date of Patent: Aug. 31, 1999

[54] ROTARY CONNECTOR

[75] Inventors: Nagao Kuroda; Hisashi Izumida; Katsutoshi Uchida, all of Miyagi-ken, Japan

[73] Assignee: Alps Electric Co., Ltd., Tokyo, Japan

[21] Appl. No.: 08/961,694

[22] Filed: Oct. 31, 1997

Related U.S. Application Data

[62] Division of application No. 08/789,228, Jan. 24, 1997, Pat. No. 5,890,921.

[30] Foreign Application Priority Data

Jan. 25, 1996 [JP] Japan ................................. 8-010959
Nov. 7, 1996 [JP] Japan ................................. 8-295193

[51] Int. Cl.$^6$ .................................................. H01R 35/04
[52] U.S. Cl. ........................................... 439/164; 439/15
[58] Field of Search ........................................ 439/164, 15

[56] References Cited

U.S. PATENT DOCUMENTS

| | | | |
|---|---|---|---|
| 3,763,455 | 10/1973 | Confer et al. ........................... | 339/3 S |
| 4,838,803 | 6/1989 | Kondo ..................................... | 439/164 |
| 5,310,356 | 5/1994 | Obata et al. ............................ | 439/164 |
| 5,562,466 | 10/1996 | Kato et al. ............................. | 439/164 |

*Primary Examiner*—Gary Paumen
*Attorney, Agent, or Firm*—Brinks Hofer Gilson & Lione

[57] ABSTRACT

A rotary connector including a fixed housing 1 equipped with an outer cylindrical wall 6, a movable housing 2 provided with an inner cylindrical wall 7, and two flat cables 3, 4 housed in a storage section 8 defined between the fixed housing 1 and the movable housing 2 and wound in a manner of inverting their winding direction halfway. Both end portions of each of the flat cables 3, 4 are fixed to the circumferential surfaces of the outer cylindrical wall 6 and the inner cylindrical wall 7. Cable fetching sections 7a, 7b for taking out the flat cables 3, 4 from the inner cylindrical wall 7 are disposed in substantially 180-degree opposed relation to each other, and a movable side joint section 12 is provided in the movable housing 2 to gather up the separated flat cables 3, 4 in one place. One end portions of the flat cables 3, 4 are led out through the movable side joint section 12 to the exterior of the movable housing 2.

4 Claims, 6 Drawing Sheets

ROTARY CONNECTOR

This application is a division of application Ser. No. 08/789,228, filed Jan. 24, 1997, now U.S. Pat. No. 5,890,921 issued Apr. 6, 1999.

BACKGROUND OF THE INVENTION

1. Field of the Invention

The present invention relates to a rotary connector built in a steering system of a motor vehicle to be used as an electrical connection means for an air bag system or the like, and more particularly to a rotary connector which is of the type that a flexible cable is wound in reverse through an inverting section within a storage or containing section defined between a fixed housing and a movable housing.

2. Description of the Related Art

A rotary connector is made in such a manner that a flexible cable is wound and accommodated in between a fixed housing (a first housing) and a movable housing (a second housing) mounted rotatably with respect to this fixed housing, and is incorporated into a steering system of a motor vehicle to be used as an electrical connection means for an air bag inflater or the like fitted in a steering wheel placed under restrictions on number of revolutions. The aforesaid flexible cable has a belt-like, configuration, so-called flat cable, which is constructed such that a base film carries conductors. For the use, the flat cable is wound to make a spiral configuration or wound and subsequently inverted halfway in the direction opposite to the previous winding direction. Of these winding methods, the inversion type can considerably shorten the necessary length of the flat cable. While this inversion type rotary connector commonly uses one flat cable, the increase in the number of conductors accompanying the increase in the number of circuits enlarges the width dimension of the flat cable, with the result that difficulty is experienced to thin the whole rotary connector. For coping with this multi-circuit problem, U.S. Pat. No. 3,763,455 discloses a rotary connector in which conductors are distributed to two flat cables.

FIG. 11 is a plan view schematically showing a structure of a cable reel in the same U.S. Patent. In the illustration, a movable housing 101 with an inner cylindrical wall is mounted rotatably relative to a fixed housing 100 with an outer cylindrical wall, and a first flat cable 103 a nd a second flat cable 104 are put in a ring-like storage section 102 defined between the fixed housing 100 and the movable housing 101. These flat cables 103, 104 are wound along the outer cylindrical wall, of the fixed housing 100 and the inner cylindrical wall of the movable housing 101 in opposite directions within the storage section 102, respectively. In this instance, U-shaped inverting sections 103a, 104a are made at the turning points of the winding direction. In addition, The inner end portions of both the flat cables 103, 104 are respectively connected to cable fetching sections 107, 108 disposed in the vicinity of the inner cylindrical wall of the movable housing 101 to be led through these cable fetching sections 107, 108 to the outside of the movable housing 101. On the other hand, the outer end portions of both the flat cables 103, 104 are respectively connected to cable fetching sections 109, 110 located in the vicinity of the outer cylindrical wall of the fixed housing 100 to be led through these cable fetching sections 109, 110 to the outside of the fixed housing 100. Moreover, in the storage section 102, groups of pluralities of rollers 105, 106 are disposed along its circumferential directions, and the inverting section 103a of the first flat cable 103 is looped around one of one group of rollers 105, while the inverting section 104a of the second flat cable 104 is looped around one of the other group of rollers 106.

In the rotary connector thus constructed, when for example the movable housing 101 is rotated clockwise in FIG. 4, the inverting sections 103a, 104a of the flat cables 103, 104 are shifted clockwise within the storage section 102 by a quantity of rotation smaller than that of movable housing 101, so that the flat cables 103, 104 get into winding and tightening conditions in which the inner cylindrical wall side of the movable housing 101 increases in winding amount. Contrary to this, when the movable housing is rotated counterclockwise, the inverting sections 103a, 104a of the flat cables 103, 104 are shifted in the same directions by a rotation quantity smaller than that of the movable housing 101, so that the flat cables 103, 104 get into rewinding conditions in which the outer cylindrical wall side of the fixed housing 100 increases in winding amount. In these winding and rewinding conditions, the rollers 105, 106 are shifted in the same directions due to the forces from the inverting sections 103a, 104a of the flat cables 103, 104.

In the case of the above-mentioned prior rotary connector, since the cable fetching sections 107, 108 for fetching the first and second flat cables 103, 104 from the movable housing 101 are disposed to be close to each other, the inner end portion of the first flat cable 103 is wound by approximately one turn around the inner cylindrical wall of the movable housing 101 and then connected to one cable fetching section 107, whereas the inner end portion of the second flat cable 104 is not directly wound around the inner cylindrical wall but is wound outside the approximately one turn of the first flat cable 103 wound around the inner cylindrical wall and then connected to the other cable fetching section 108. For this reason, both the flat cables 103, 104 differ in winding condition relative to the inner cylindrical wall of the movable housing 101 from each other, and hence the winding diameter of the first flat cable 103 with respect to the inner cylindrical wall assumes the diameter D of the inner cylindrical wall while the winding diameter of the second flat cable 104 with respect to the inner cylindrical wall comes to a value (D+2t) obtained by adding twice the thickness t of the first flat cable 103 to the diameter D of the inner cylindrical wall, with the result that the winding diameters of both the flat cables 103, 104 differ from each other. Accordingly, the winding quantities or the rewinding quantities of both the flat cables 103, 104 to or from the inner cylindrical wall are different from each other, and hence, when the movable housing 101 moves, the inverting sections 103a, 104a of both the flat cables 103, 104 shift at different speeds within the storage section 102. Thus, for example, when the movable housing 101 is rotated in the winding and tightening direction, there is a possibility that the inverting section 103a of the first flat cable 103 collides against the rear end portion of the roller 106 group to be stopped from movement.

SUMMARY OF THE INVENTION

In accordance with the present invention, cable fetching sections for fetching a plurality of (N) flexible cables from an inner cylindrical wall are decentralized or separated from each other to make approximately 360/N degrees between the adjacent cable fetching sections and a movable side joint section is provided on a movable housing to put the separated flexible cables together in one place. If the cable fetching sections for the N flexible cables are decentralized at 360/N degrees, the respective flexible cables around the inner cylindrical wall come into the same wound conditions, and hence at the rotating operation of the movable housing the inverting sections of the respective flexible cables can shift at the substantially same speed within a storage section. In addition, since the respective flexible cables separated through the cable fetching sections are put together or gathered up in one place through the movable side joint section, it is possible to simplify a connection structure with an external connector on the steering wheel side.

Furthermore, in accordance with this invention, a plurality of (N) flexible cables are fetched from the same, cable fetching section and wound around an inner cylindrical wall, with a recess portion with a given depth being made over a given range in an outer circumferential surface of this inner cylindrical wall. Thus, the flexible cables inside the outermost flexible cable are wound along the outer circumferential surface of the inner cylindrical wall along the recess portion with a small diameter, whereas the outermost flexible cable is wound on the flexible cables wound along the recess portion, with the result that the cable fetching section for fetching the respective flexible cables from the inner cylindrical wall is apparently separated at approximately 360/N degrees so that the wound states of the respective flexible cables on the inner cylindrical wall substantially become the same.

BRIEF DESCRIPTION OF THE DRAWINGS

The object and features of the present invention will become more readily apparent from the following detailed description of the preferred embodiments taken in conjunction with the accompanying drawings in which.

DESCRIPTION OF THE PREFERRED EMBODIMENTS

Figure 1:
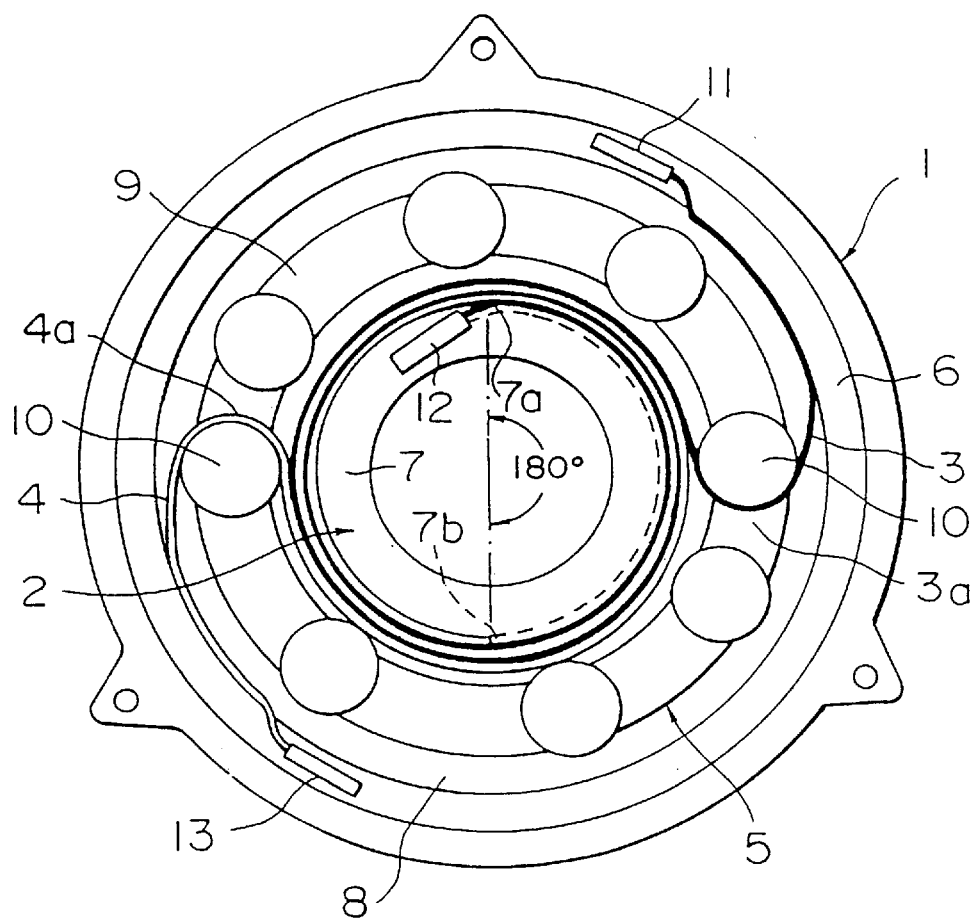
FIG. 1 is a plan view showing a rotary connector according to a first embodiment of the present invention.

A rotary connector according to the present invention is equipped with a first housing with an outer cylindrical wall, a second housing with an inner cylindrical wall rotatably mounted with respect to the first housing to be in opposed relation to the outer cylindrical wall with a ring-like storage section being interposed therebetween, and a plurality of flexible cables wound within the storage section in a manner of inverting its winding direction halfway and made such that their both ends are respectively fixed to the outer cylindrical wall and the inner cylindrical wall, wherein cable fetching sections for fetching the flexible cables from the inner cylindrical wall are separated from each other to make approximately 360/N degrees (N signifies the number of flexible cables) therebetween, and a movable side joint section is provided within the second housing to put the respective flexible cables decentralized through the cable fetching sections together in one place, and one end portions of the respective flexible cables are electrically led out through the movable side joint section to the exterior of the second housing.

For example, as a means to equally disperse the cable fetching sections for the respective flexible cables, N slits are made in a circumferential surface of the inner cylindrical wall at substantially equal intervals and the inner end portions of the respective flexible cables are inserted into these slits and put in the interior of the inner cylindrical wall, and subsequently the flexible cables are put together in one place by means of the movable side joint section.

Although the inverting sections of the respective flexible cables do not undergo restrictions on separation within the storage section, to heighten the effects they may be separated by approximately 360/N degrees from each other as in the case of the cable fetching sections for taking out the respective flexible cables from the inner cylindrical wall. Further, although the cable fetching sections for pulling out the respective flexible cables from the outer cylindrical wall are not subject to restrictions in disposition, if the cable fetching sections for taking out the flexible cables from the inner cylindrical wall, the inverting sections and the cable fetching sections for taking out them from the outer cylindrical wall are respectively disposed to separate from each other by approximately 360/N degrees, the respective flexible cables extending from the inner cylindrical wall through the inverting sections to the outer cylindrical wall can apparently come into the same wound condition. Still further, in the case that a fixed side joint section is provided within the first housing to gather up the respective flexible cables in one place so that the other end portions of the flexible cables are led out through this fixed side joint section to the exterior of the fixed housing, it is possible to simplify the connection structure with a stator side external connector.

Moreover, a rotary connector according to this invention is provided with a first housing with an outer cylindrical wall, a second housing with an inner cylindrical wall mounted rotatably with respect to the first housing to be in opposed relation through a ring-like storage section to the outer cylindrical wall, and a plurality of flexible cables wound in a way of inverting its winding direction halfway and made such that their both ends are respectively fixed to the outer cylindrical wall and the inner cylindrical wall, wherein cable fetching sections for fetching the respective flexible cables from the inner cylindrical wall are gathered up in one place and a outer circumferential surface of the inner cylindrical wall are divided or sectioned along the circumferential direction from this cable fetching section into areas each corresponding to approximately 360/N degrees (N represents the number of flexible cables), and except for one of these areas a recess portion is made such that its depth gradually becomes smaller from the area closest to the cable fetching sections in the direction of winding the flexible cables. With this structure, the wound states of the respective flexible cables substantially become the same, which can ensure smooth winding and rewinding operations, and further the respective flexible cables are gathered up in one place on the movable side joint section, which can simplify the connection structure with an external connector on the steering wheel side.

Furthermore, when the depth of the recess portion is set to assume approximately (N−1)t, (N−2)t, ..., (N−n)t (where t represents the thickness of the flexible cables, n designates a natural number, and (N−n)>0) in order along the winding direction of the flexible cables from the area closest to the cable fetching sections, the respective flexible cables get into the same wound condition around the inner cylindrical wall, so that the winding and rewinding operations becomes more smoothable.

Although the inverting sections of the flexible cables are not limited in separation, it is effective that they are decentralized at approximately 360/N degrees as well as the cable fetching sections for fetching the flexible cables from the inner cylindrical wall. Further, although the cable fetching sections for taking out the flexible cables from the outer cylindrical wall can take any disposition, if the cable fetching sections for deriving the flexible cables from the inner cylindrical wall, the inverting sections and the cable fetching section for taking out the flexible cables from the outer cylindrical wall are respectively dispersed at approximately 360/N degrees, the flexible cables extending from the inner cylindrical wall through the inverting sections to the outer cylindrical wall can apparently get into the same wound condition.

Still further, in the case that a fixed side joint section is provided within the fixed housing to gather up the flexible cables in one place so that the other end portions of the respective flexible cables are led out through this fixed side joint section to the outside of the fixed housing, it is possible to simplify the connection structure with the stator side external connector. While the number of flexible cables are not placed under restrictions, particularly in the case of using two flexible cables, the recess portion is made over a range of approximately 180 degrees from the cable fetching section on a circumferential surface of the inner cylindrical wall. With this structure, the wound states of the two flexible cables along the inner cylindrical wall substantially become the same, which can ensure the smooth winding and rewinding operations, and further both the flexible cables are gathered up in one place through the movable side joint section, which can simplify the connection structure to an external connector in a steering wheel side.

Embodiments

A first embodiment of the present invention will be described hereinbelow with reference to the drawings. As shown in FIG. 1, a rotary connector substantially comprises a fixed housing 1 being a first housing, a movable housing 2 being a second housing mounted rotatably with respect to the fixed housing 1, first and second flat cables 3, 4 accommodated between both the housings 1, 2, and a movable body 5 rotatably placed between both the housings 1, 2. In addition, the fixed housing 1 is equipped with an outer cylindrical wall 6, while the movable housing 2 is provided with an inner cylindrical wall 7. The outer cylindrical wall 6 and the inner cylindrical wall 7 are coaxially disposed to define a storage section 8 therebetween. The movable body 5 is composed of a ring-like rotary plate 9 and a group of a plurality of rollers 10 rotatably supported on a ring-like rotary plate 9, and is situated within the storage section 8. The first and second flat cables 3, 4, being flexible cables, have a belt-like body in which a plurality of conductors made of a copper or the like are stretched on one side surface of a base film comprising an insulating tape such as a PET. In FIG. 1, for convenience, the first flat cable 3 is indicated with black while the second flat cable 4 is shown with white. The outer end portion of the, first flat cable 3 is connected with a first fixed side joint section 11 fixed to the outer cylindrical wall 6 to be electrically led out through the first fixed side joint section 11 to the exterior of the fixed housing 1, whereas the inner end portion of the first flat cable 3 is connected to a movable side joint section 12 fixed to the inner cylindrical wall 7. Further, within the storage section 8 the first flat cable 3 is wound clockwise along the outer cylindrical wall 6 from the first fixed side joint section 11 and then inverted through one roller of the roller 10 group to make a U-turn (this section will be referred hereinafter to as an inverting section 3a). After the inversion, the first flat cable 3 is wound counterclockwise along the circumferential surface of the inner cylindrical wall 7 and then inserted through a first movable side cable fetching section 7a into the interior of the inner cylindrical wall 7 to extend to a movable side joint section 12.

Figure 2:
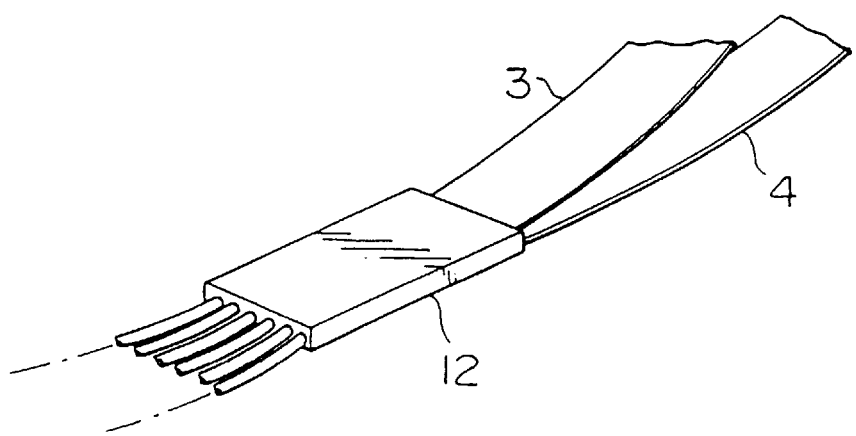
FIG. 2 is a perspective view showing a movable side joint section to be used for the rotary connector of FIG. 1.

On the other hand, the outer end portion of the second flat cable 4 is connected to a second fixed side joint section 13 fixed to the outer cylindrical wall 6 to be electrically led out through the second fixed side joint section 13 to the exterior of the fixed housing 1. This second fixed side joint section 13 is fixedly positioned in diametrically (approximately 180-degree) opposed relation to the first fixed side joint section 11. Further, as shown in FIG. 2, the inner end portion of the second flat cable 4 is connected to the movable side joint section 12. Owing to this movable joint section 12, both the flat cables 3, 4 are gathered up in one place. Still further, within the storage section 8 the second flat cable 4 is wound clockwise along the outer cylindrical wall 6 from the second fixed side joint section 13 and then inverted through a different one of the roller 10 group to make a U-turn (this section will be referred hereinafter to as an inverting section 4a). After the inversion, the second flat cable 4 is further wound counterclockwise around the circumferential surface of the inner cylindrical wall 7 to extend to the movable side joint section 12. In this case, the roller 10 for looping the inverting section 3a of the first flat cable 3 is positioned in diametrically (approximately 180-degree) opposed relation to the roller 10 for setting up the inverting section 4a of the second flat cable 4. Further, the inner end portion of the second flat cable 4 is inserted into the interior of the inner cylindrical wall 7 through a second movable side cable fetching section 7b which is located in approximately 180-degree opposed relation to the first movable side cable fetching section 7a, before being, together with the first flat cable 3, connected to the movable side joint section 12 within the inner cylindrical wall 7. Accordingly, the inner end portion of the first flat cable 3 is half-turned along the circumferential surface of the inner cylindrical wall 7 and then wound outside the second flat cable 4, while the inner end portion of the second flat cable 4 is half-turned along the circumferential surface of the inner cylindrical wall 7 and then wound outside the first flat cable 3, so that both the flat cables 3, 4 take the same wound condition with respect to the inner cylindrical wall 7.

Secondly, a description will be taken hereinbelow of an operation of the rotary connector according to the first embodiment. In this case, the fixed housing 1 is fixedly secured to a stator member of a steering apparatus, and the first and second fixed side joint sections 11, 13 are connected to an external connector (not shown) in the vehicle body side. In addition, the movable housing 2 is fixed to a steering wheel which is a rotor member of the steering apparatus, and the movable side joint section 12 is connected to an external connector (not shown) in the steering wheel side. When in use the steering wheel is rotated clockwise or counterclockwise, its rotational force is transferred to the movable housing 2 which in turn, rotates clockwise or counterclockwise. For example, if the movable housing 2 is rotationally shifted clockwise from the neutral position of the steering wheel, the inverting sections 3a, 4a of the first and second flat cables 3, 4 are shifted clockwise by quantities smaller than the rotational movements of the movable housing 2, and the movable body 5 is also shifted clockwise following the movements of these inverting sections 3a, 4a. In consequence, the flat cables 3, 4 are fed from the inner cylindrical wall 7 side by the length which is substantially twice these moving quantities and rewound toward the outer cylindrical wall 6, thus coming into the rewinding state. In this instance, both the flat cables 3, 4 get into the above-mentioned wound state with respect to the inner cylindrical wall 7, and since the inverting sections 3a, 4a of both the flat cables 3, 4 substantially shift at the same speed, there is no difference between the rewinding quantities of both the flat cables 3, 4 from the inner cylindrical wall 7 side, with the result that sure rewinding operation is practicable.

On the contrary, if the movable housing 2 rotates counterclockwise from the neutral position of the steering wheel, the inverting sections 3a, 4a of both the flat cables 3, 4 move counterclockwise by quantities smaller than the rotating quantity of the movable housing 2, and the movable body 5 also moves in accordance with the movements of these inverting sections 3a, 4a. As a result, the flat cables 3, 4 are delivered from the outer cylindrical wall 6 by the length which is approximately twice the these moving quantities and wound around the inner cylindrical wall 7, thus getting into the winding condition. Also in this case, since there is no difference between the winding quantities of both the flat cables 3, 4 around the inner cylindrical wall 7, the inverting sections 3a, 4a of both the flat cables 3, 4 substantially move at the same speed within the storage section 8 so that sure winding operation is possible.

In the above-described first embodiment, since the movable side cable fetching sections 7a, 7b for deriving the two flat cables 3, 4 from the inner cylindrical wall 7 are separated by approximately 180 degrees (=360/2) from each other, the wound states of both the flat cables 3, 4 around the inner cylindrical wall 7 become equal to each other, with the result that at the rotating operation of the movable housing 2 the inverting sections 3a, 4a of both the flat cables 3, 4 can move at the substantially same speed. In addition, since the inner end portions of both the flat cables 3, 4 separated through the first and second movable side cable fetching sections 7a, 7b are gathered up in one place by means of the movable side joint section 12, it is possible to simplify the connection structure with a steering wheel side external connector.

Furthermore, in addition to the movable side cable fetching sections 7a, 7b of both the flat cables 3, 4, the inverting sections 3a, 4a and the fixed side joint sections 11, 13 are disposed in approximately 180-degree opposed relation, and hence a portion extending from the first movable side cable fetching section 7a for the first flat cable 3 through the inverting section 3a to the first fixed side joint section 11 and a portion extending from the second movable side cable fetching section 7b for the second flat cable 4 through the inverting section 4a to the second fixed side joint section 13 can be encased within the storage section 8 in the similarly wound condition, with the result that the smooth winding and rewinding operations are possible in no state that both the flat cables 3, 4 interfere with each other.

Figure 3:
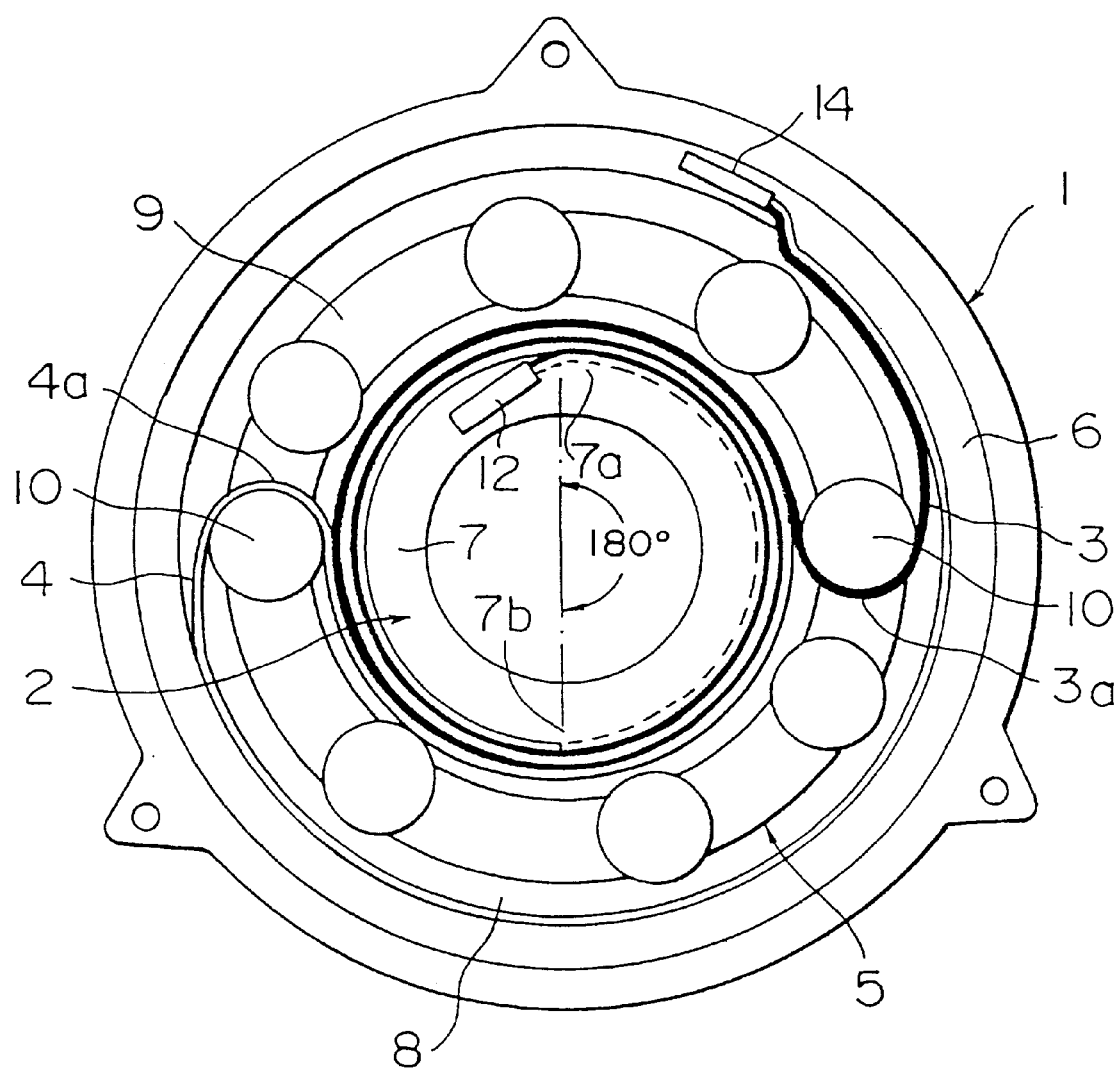
FIG. 3 is a plan view showing a rotary connector according to a second embodiment of this invention.

In a second embodiment shown in FIG. 3, the second flat cable 4 extends along the inner circumferential surface of the outer cylindrical wall 6, and the outer end portions of the first and second flat cables 3, 4 are connected to a common fixed side joint section 14 fixed to the outer cylindrical wall 6. In this case, the extending portion of the second flat cable 4 only serves as a connection to the fixed side joint section 14 and does not separate from the inner circumferential surface of the outer cylindrical wall 6 even at the winding operation.

In this embodiment with such a construction, the outer end portions of both the flat cables 3, 4 are led out through the common fixed side joint section 14 to outside the fixed side housing 1, and hence, in addition to the effects of the FIG. 1 first embodiment, it is further possible to simplify the connection structure with a stator side external connector.

Although in the above-described embodiments the number of flat cables is 2, i.e., N=2, it is also possible to use three or more flat cables (N=3, 4, 5. . . )

Figure 4:
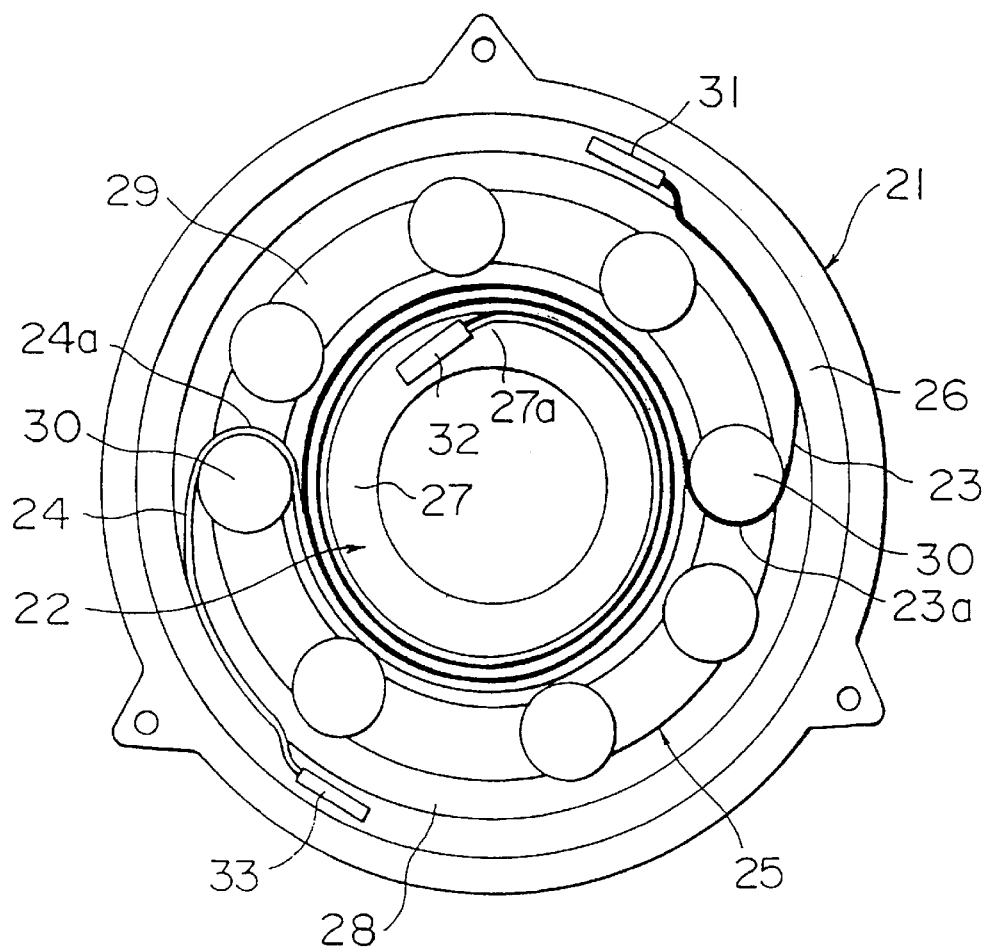
FIG. 4 is a plan view showing a rotary connector according to a third embodiment of this invention.
Figure 5:
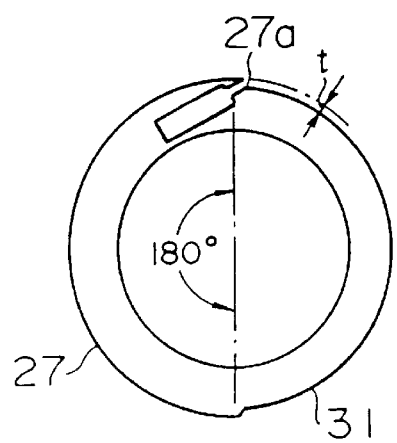
FIG. 5 is an illustration useful for describing a movable housing for the rotary connector.
Figure 6:
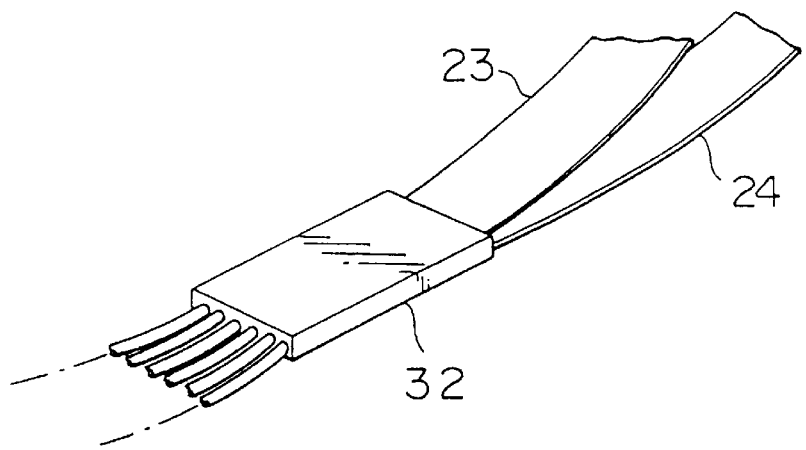
FIG. 6 is a perspective view showing a movable side joint section available for the rotary connector.

Furthermore, a description will be made hereinbelow of a third embodiment of this invention with reference to the drawings. FIG. 4 is a plan view showing a rotary connector, FIG. 5 is an illustration for explaining a movable housing used for the FIG. 4 rotary connector, and FIG. 6 is a perspective view showing a movable side joint section used for the rotary connector. As shown in FIG. 4, the rotary connector substantially comprises a fixed housing 21 being a first housing, a movable housing 22 being a second housing mounted rotatably with respect to the fixed housing 21, first and second flat cables 23, 24 accommodated between both the housings 21, 22, and a movable body 25 disposed rotatably between both the housings 21, 22. The fixed housing 21 is equipped with an outer cylindrical wall 26 while the movable housing 22 is provided with an inner cylindrical wall 27. The outer cylindrical wall 26 and the inner cylindrical wall 27 are in coaxial relation to each other to define a ring-like storage section 28 between both the walls 26, 27. The movable body 25 is composed of a ring-like rotary plate 29 and a group of a plurality of rollers 30 rotatably supported on a ring-like rotary plate 29, and is located within the storage section 28. As shown in FIG. 5, a movable side cable fetching section 27a is formed in the inner cylindrical wall 27 and a recess portion 31 starting from this movable side cable fetching section 27a is formed over a range of 180 degrees in the circumferential direction of the inner cylindrical wall 27. The depth of this recess portion 31 is set to t, and when the diameter of the inner cylindrical wall 27 is taken as D, the radius of a section of the inner cylindrical wall 27 where the recess portion 31 is not made is D/2 while the radius of a section of the inner cylindrical wall 27 where the recess portion 31 is made becomes (D−t)/2.

The first and second flat cables 23, 24, being flexible cables, have a belt-like body in which a plurality of conductors made of copper or the like are stretched on one side surface of a base film made of an insulating tape such as a PET, and its thickness is set to t (for convenience, the first flat cable 23 is shown with black while the second flat cable 24 is indicated with white). As shown in FIG. 6, the inner end portions of the first and second flat cables 23, 24 are connected to a movable side joint section 32 to be electrically led out through this movable side joint section 32 to the exterior of the movable housing 22. In addition, the outer end portion of the first flat cable 23 is connected to a first fixed side joint section 33 fixed to the outer cylindrical wall 26, whereas the outer end portion of the second flat cable 24 is connected to a second fixed side joint section 34 fixed to the outer cylindrical wall 26. The outer end portions of both flat cables 23, 24 are electrically led out through the first and second fixed side joint sections 33, 34 to the exterior of the fixed housing 21.

Within the storage section 28 the first flat cable 23 is wound clockwise from the first fixed side joint section 33 along the outer cylindrical wall 26 and then inverted through one of the group of rollers 30 to make a U-turn (this inverted portion will be referred hereinafter to as an inverting section 23a). After the inversion, the first flat cable 23 is wound counterclockwise around the circumferential surface of the inner cylindrical wall 27 and then inserted through the movable side cable fetching section 27a into the interior of the inner cylindrical wall 27 to extend to the movable side joint section 32. On the other hand, within the storage section 28 the second flat cable 24 is wound clockwise from the second fixed side joint section 34 along the outer cylindrical wall 26 and then inverted through another roller of the group of rollers 10 to make a U-turn (this wound section will be referred hereinafter to as an inverting section 24a). After the inversion, the second flat cable 24 is wound counterclockwise around the circumferential surface of the inner cylindrical wall 27 and then extends to the movable side joint section 32. In this case, the roller 30 for looping the inverting section 23a of the first flat cable 23 and the roller 30 for looping the inverting section 24a of the second flat cable 24 are positioned in approximately 180-degree opposed relation to each other.

The inner end portions of the first and second flat cables 23, 24 are wound around the inner cylindrical wall 27 in a state that the first flat cable 23 is on the outside. At this time, the second flat cable 24 wound inside enters the recess portion 31 at the position which is in approximately 180-degree opposed relation to the movable side cable fetching section 27a and is wound by half of one turn to extend to the movable side joint section 32. That is, within the range of approximately 180 degrees from the movable side cable fetching section 27a, the second flat cable 24 with a thickness of t is wound in the recess portion 31 with a depth of t, and hence the winding diameter of the first flat cable 23 wound around the inner cylindrical wall 27 but outside the second flat cable 24 becomes substantially equal to the diameter D of the inner cylindrical wall 27. Accordingly, the inner end portion of the first flat cable 23 is wound by half of one turn outside the second flat cable 24 in a state that its winding diameter is the diameter D of the inner cylindrical wall 27 and subsequently wound outside the second flat cable 24 in a state that its winding diameter is (D+2t) obtained by adding twice the thickness t of the second flat cable 24 to the diameter D of the inner cylindrical wall 27. On the other hand, the inner end portion of the second flat cable 24 comes out at the position which is in approximately 180-degree opposed relation to the movable side cable fetching section 27a and then is wound around the circumferential surface of the inner cylindrical wall 27 by half of one turn in a state that its winding diameter assumes D. Subsequently, it is further wound outside the first flat cable 23 in a state that its winding diameter is (D+2t), so that both the flat cables 23, 24 get into the same wound condition with respect to the inner cylindrical wall 27.

Although in this embodiment the depth of the recess portion 31 is made to equal the thickness t of the flexible cables and the thickness t is optimal, the presence of the recess portion 31 can offer similar effects more or less. That is, even if the speeds of the two inverting sections 23a, 24a slightly change, the change is disregardable, and the smooth rotation is practicable without hindrance. In addition, for example, if the boundary lines appearing at both ends of the recess portion 31 in the circumferential directions, which change in depth, are made smoothly, the variation of the winding diameter of the flat cables can be softened so that the smooth winding operation of the flat cables is realizable.

Secondly, a description will be taken hereinbelow of an operation of the rotary connector according to this embodiment. In this case, the fixed housing 21 is fixedly secured to a stator member of a steering apparatus, and the first and second fixed side joint sections 33, 34 are connected to an external connector (not shown) in a vehicle body side. Further, the movable housing 22 is fixed to a steering wheel which is a rotor member of the steering apparatus, and the movable side joint section 32 is connected to an external connector (not shown) in the steering wheel side. In use, when the steering wheel is rotated clockwise or counterclockwise, its rotational force is transferred to the movable housing 22 so that the movable housing 22 rotates clockwise or counterclockwise. For example, when the movable housing 22 is rotated clockwise from the neutral position of the steering wheel, the inverting sections 23a, 24a of the first and second flat cables 23, 24 shift clockwise by quantities smaller than the rotating amount of the movable housing 22, and the movable body 25 also shifts in accordance with the movements of these inverting sections 23a, 24a. Consequently, the flat cables 23, 24 are delivered from As the inner cylindrical wall 27 side by a length corresponding to approximately twice these moving quantities and wound on the outer cylindrical wall 26 side, thus coming into the rewinding condition. In this case, the wound states of both the flat cables 23, 24 around the inner cylindrical wall 27 become the same, and since the inverting sections 23a, 24a of both the flat cables 23, 24 move at the substantially same speed, there is no difference between the rewinding quantities of both the flat cables 23, 24 from the inner cylindrical wall 27 side, with the result that the certain rewinding operation is possible.

Contrary to this, if the movable housing 22 is rotated counterclockwise from the neutral position of the steering wheel, the inverting sections 23a, 24a of both the flat cables 23, 24 shift counterclockwise by rotating quantities smaller than the movement of the movable housing 22, and the movable body 25 also shifts in accordance with the movements of the inverting sections 23a, 24a. In consequence, the flat cables 23, 24 are delivered from the outer cylindrical wall 26 by a length corresponding to approximately twice these moving quantities and wound along the inner cylindrical wall 27, thus coming into the winding condition. Also in this case, since there is no difference between the winding quantities of both the flat cables 23, 24 around the inner cylindrical wall 27, the inverting sections 23a, 24a of both the flat cables 23, 24 move at the substantially same speed within the storage section 28, thereby ensuring the certain winding operation.

Figure 7:
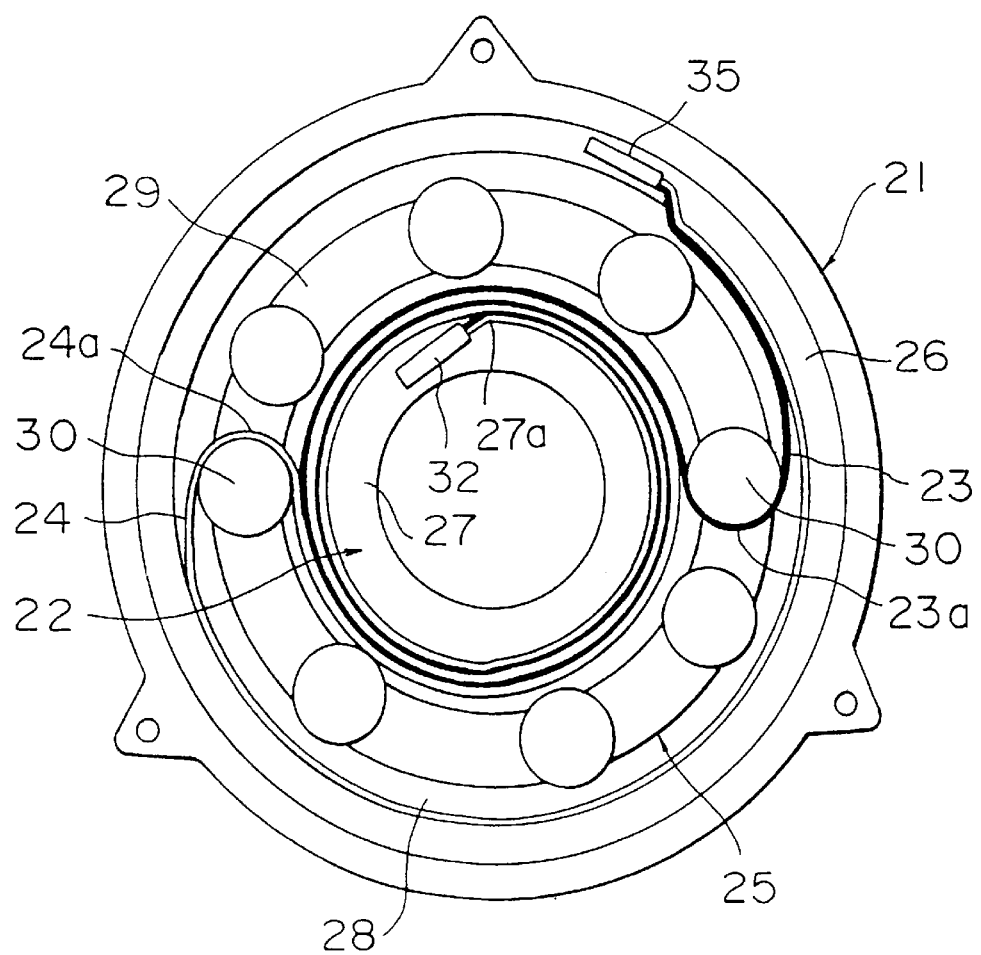
FIG. 7 is a plan view showing a rotary connector according to a fourth embodiment of this invention.

In a fourth embodiment shown in FIG. 7, the second flat cable 24 is made to extend to the inner circumferential surface of the outer cylindrical wall 26, and the outer end portions of the first and second flat cables 23, 24 are connected to a common joint section 35 fixed to the outer cylindrical wall 26. In this case, the extending portion of the second flat cable 24 only serves as a connection to the fixed side joint section 35 and does not separate from the inner circumferential surface of the outer cylindrical wall 26 even at the winding operation. In this fourth embodiment thus constructed, since the outer end portions of both the flat cables 23, 24 are led out through the common fixed side joint section 35 to the exterior of the fixed housing 21, in addition to the effects of the third embodiment as shown in FIG. 4, it is possible to further simplify the connection structure with the stator side external connector.

Figure 8:
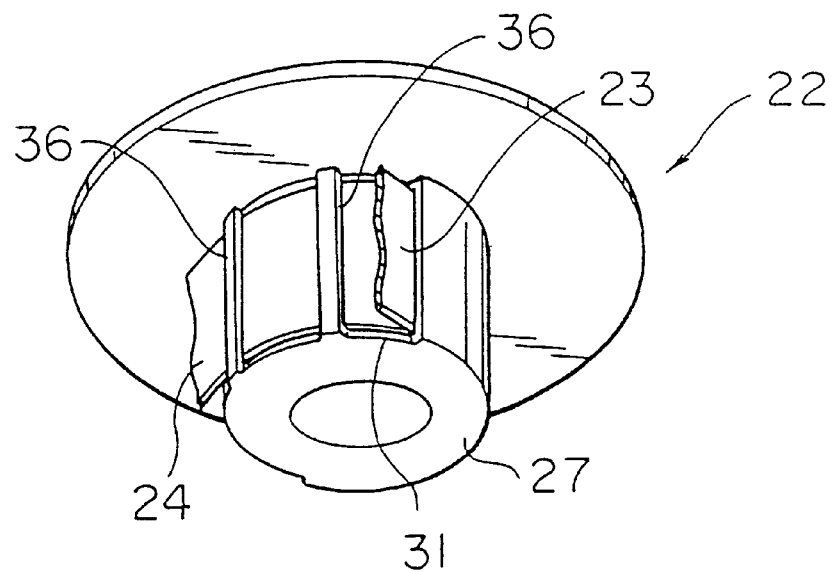
FIG. 8 is a perspective view showing a movable housing in a fifth embodiment of this invention.

In a fifth embodiment shown in FIG. 8, outside the recess portion there are disposed a plurality of column-like portions 36 extending in the axial directions of the inner cylindrical wall 27, with these column-like portions 36 being formed integrally with the movable housing 22. The inner end portion of the first flat cable 23 is wound outside the respective column-like portions 36, whereas the inner end portion of the second flat cable 24 is wound along the recess portion 31 inside the respective column-like portions 36, so that the second flat cable 24 can be positioned with respect to the recess portion 31. The diameter of the inner cylindrical wall 27 including the respective column-like portions 36 is determined to be small to the utmost in order to have no effect on the winding diameter of the first flat cable 23. In addition, if decreasing the number of column-like portions 36, even if difficulty is encountered to thin the thickness of the column-like portions 36, the winding diameter of the first flat cable 23 increases only at the places where the column-like portions 36 exist, thus producing less influence thereupon. Further, if the column-like portions 36 are placed at the end of the recess portion 31, the second flat cable 24 can be positioned to be accommodated within the whole recess portion 31, which is preferable.

Figure 9:
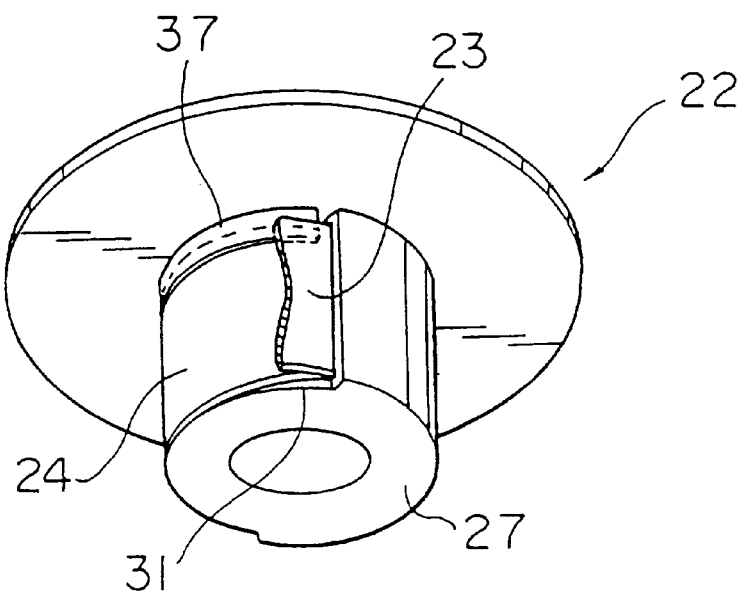
FIG. 9 is a perspective view showing a movable housing in a sixth embodiment of this invention.

In a sixth embodiment shown in FIG. 9, outside the recess portion 31 there is disposed a projection 37 extending in the circumferential direction of the inner cylindrical wall 27, with this projection being formed integrally with the movable housing 22. The inner end portion of the first flat cable 23 is wound outside the projection 37, whereas the second flat cable 24 is wound in the recess portion 31 inside the projection 37 so that the second flat cable 24 can be positioned with respect to the recess portion 31. The diameter of the inner cylindrical wall 27 including the projection 37 is made to be small to the utmost in order to exert no influence upon the winding diameter of the first flat cable 23.

Further, if the projection 37 is extended up to the end of the recess portion 31, the second flat cable 24 can be positioned to be accommodated within the whole recess portion 31, which is preferable.

Figure 10:
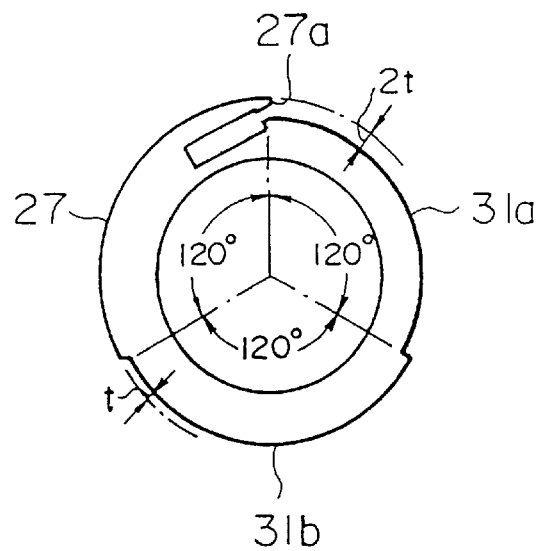
FIG. 10 is an explanatory illustration of a movable housing in a seventh embodiment of this invention.
Figure 11:
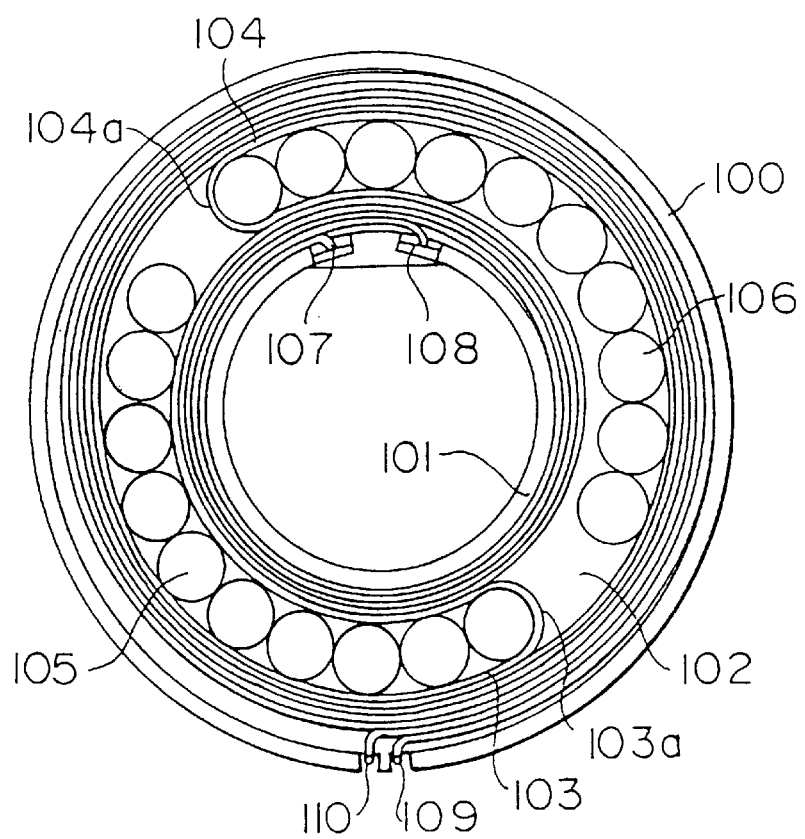
FIG. 11 is a plan view showing a prior rotary connector.

Although in the above-mentioned embodiments the number of flat cables is 2, i.e., N=2, it is also possible to use three or more flat cables (N=3, 4, 5...) For example, in the case of a seventh embodiment using three flat cables (N=3), as shown in FIG. 10 the circumferential surface of the inner cylindrical wall 27 is divided from the movable side cable fetching section 27a along the circumferential direction into three areas each corresponding to 120 degrees, and a recess portion 31a with a depth of approximately 2t is made in the area closest to the movable side cable fetching section 27a while a recess portion 31b with a depth of approximately t is made in the next area. In this case, for example, the boundary portion between the recess portion 31a and the recess portion 31b, in which the depth changes, is formed smoothly to soften the variation of the winding diameter of the flat cables, which can realize the smooth winding operation of the flat cables.

Furthermore, although in the above-described embodiments the first housing is the fixed housing and the second housing is the movable housing, even if the first housing is made as the movable housing while the second housing acts as the fixed housing, this takes effect equivalent to the above description.

The above-described embodiments of this invention can, produce the following effects.

Since the cable fetching sections for deriving a plurality of (N) flexible cables from the inner cylindrical wall are separately disposed at every approximately 360/N degrees so that the wound states of the respective flexible cables around the inner cylindrical wall become equal to each other, with the result that the inverting sections of the flexible cables can move at the substantially same speed at the rotating operation of the movable housing, which can ensure the smooth winding and rewinding operations. In addition, the respective flexible cables separated through the cable fetching sections are gathered up in one place through the movable side joint section, which can simplify the connection structure with a steering wheel side external connector. Further, like the cable fetching sections for taking out the respective flexible cables from the inner cylindrical wall, the inverting sections of the respective cables or the cable fetching sections for fetching the respective flexible cables from the outer cylindrical wall are separately disposed at approximately 360/N degrees, the wound states of the respective flexible cables extending from the inner cylindrical wall through the inverting sections to the outer cylindrical wall become the same, which is more effective. Still further, the fixed side joint section is provided at the fixed housing to put the respective flexible cables together in one place and the other end portions of the flexible cables are electrically led out through this fixed side joint section to the exterior of the fixed housing, and hence it is possible to simplify the connection structure with an stator side external connector.

Moreover, the cable fetching sections for fetching a plurality of (N) flexible cables from the inner cylindrical wall are centralized in one place and the outer circumferential surface of the inner cylindrical wall are divided from these cable fetching sections in the circumferential direction into areas each corresponding to approximately 360/N degrees (N represents the number of flexible cables) and except for one of these areas a recess portion starting at the area closest to the aforesaid cable fetching sections is made along the winding direction of the flexible cables so that its depth successively becomes shallower, and hence, since the respective flexible cables come into the substantially same wound state around the inner cylindrical wall, the winding and rewinding operations becomes smoothable, and further since the respective flexible cables are gathered up in one place by means of the movable side joint section, it is possible to simplify the connection structure with a steering wheel side external connector.

Furthermore, the depth of the aforesaid recess portion is set to successively assume approximately (N−1)t, (N−2)t, ..., (N−n)t (where t represents the thickness of the flexible cables, n designates a natural number, and (N−n)>0) along the winding direction of the flexible cables from the area closest to the cable fetching sections, and therefore the wound states of the respective flexible cables with respect to the inner cylindrical wall become equal to each other, with the result that the winding or rewinding operation becomes more smoothable. In addition, as well as the cable fetching sections for fetching the respective flexible cables from the inner cylindrical wall, the inverting sections of the flexible cables or the cable fetching sections for deriving the flexible cables from the outer cylindrical wall are separately disposed at approximately 360/N degrees, with the result that the respective flexible cables extending from the inner cylindrical wall through the inverting sections to the outer cylindrical wall get into the same wound condition, which is more effective. Still further, since the fixed side joint section is provided in the fixed housing to gather up the respective flexible cables in one place and the other end portions of the flexible cables are electrically led out through this fixed side joint section to outside the fixed housing, it is possible to simplify the connection structure with a stator side external connector.

In addition, although the number of flexible cables does not undergo restrictions, in cases where particularly two flexible cables are used, if the recess portion is made over the range of approximately 180 degrees on the circumferential surface of the inner cylindrical wall on the basis of the aforesaid cable fetching section, the wound states of the two flexible cables with respect to the inner cylindrical wall substantially become the same, which can ensure the smooth winding or rewinding operation, and further since both the flexible cables can be gathered up in one place by means of the movable side joint section, it is possible to simplify the connection structure with a steering side external connector. Further, the column-like portions are formed along the outer ciurcumferential surface of the inner cylindrical wall, with the result that the second flat cable can be positioned with respect to the recess portion, which is preferable. Moreover, the projection is formed along the outer circumferential surface of the inner cylindrical wall, with the result that the second flat cable can be positioned with respect to the recess portion, which is preferable.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A rotary connector comprising:

a first housing having an outer cylindrical wall;

a second housing mounted to be relatively rotatable with respect to said first housing, said second housing having an inner cylindrical wall which is in opposed relation to said outer cylindrical wall in a state that a ring-like storage section is interposed therebetween; and a plurality of flexible cables housed within said storage section in a state with being wound and further wound after its winding direction is inverted halfway, both end portions of said flexible cables being fixedly secured to said outer cylindrical wall and said inner cylindrical wall, respectively, wherein cable fetching sections for taking out said flexible cables from said inner cylindrical wall are separately disposed at positions each corresponding to approximately 360/N degrees where N represents the number of said flexible cables, and a joint section is provided in said second housing to gather up said flexible cables, separated through said cable fetching sections, in one place so that one end portion of each of said flexible cables is led out through said joint section to the exterior of said second housing.

2. The rotary connector of claim 1, wherein the inverting sections of said flexible cables are separately disposed at positions each corresponding to approximately 360/N degrees within said storage section.

3. The rotary connector of claim 1, wherein a joint section is provided in said first housing to gather up the other end portions of said flexible cables in one place.

4. The rotary connector of claim 1, wherein said inner cylindrical wall has a projection.

* * * * *